United States Patent
Nagashima et al.

[11] Patent Number: 5,683,804
[45] Date of Patent: Nov. 4, 1997

[54] GLASS PLATE WITH ULTRAVIOLET AND INFRARED ABSORBING FILM

[75] Inventors: Toshikazu Nagashima; Haruki Kuramashi; Nobuhiko Seto; Koichi Yamamoto, all of Matsusaka, Japan

[73] Assignee: Central Glass Company, Limited, Yamaguchi, Japan

[21] Appl. No.: 431,072

[22] Filed: Apr. 27, 1995

[30] Foreign Application Priority Data

Apr. 28, 1994 [JP] Japan .................. 6-092230

[51] Int. Cl.⁶ .................. B32B 17/10
[52] U.S. Cl. .................. 428/336; 428/425.5; 428/425.6; 428/429; 428/441; 428/442; 428/447; 428/448; 428/451
[58] Field of Search .................. 428/425.5, 425.6, 428/429, 441, 442, 447, 448, 451, 336

[56] References Cited

U.S. PATENT DOCUMENTS 5,112,682  5/1992  Inouye et al. .................. 428/353

FOREIGN PATENT DOCUMENTS

| 0 513 690 A2 | 11/1992 | European Pat. Off. |
| 0597391A1 | 5/1994 | European Pat. Off. |
| 1503728 | 2/1968 | France |
| 50-15473 | 6/1975 | Japan |
| 59-152249 | 8/1984 | Japan |
| 60-21936 | 5/1985 | Japan |
| 2-75683 | 3/1990 | Japan |
| 2-311332 | 12/1990 | Japan |
| 3-247537 | 11/1991 | Japan |
| 4 160 037 | 6/1992 | Japan |
| 4-160037 | 6/1992 | Japan |
| 4-44721 | 7/1992 | Japan |
| 4-224133 | 8/1992 | Japan |
| 5-42622 | 2/1993 | Japan |
| 6 184 527 | 7/1994 | Japan |

OTHER PUBLICATIONS

Shirokshina, Z.V., et al., "Protecting coated optical component from the action of a humid atmosphere", vol. 43, No. 2, Feb. 1976, pp. 103–105.

Nagashima, T., et al., "Preparation of UV light absorbing glass by colorless transparent resin coatings", 6058 Journal of Non-Crystalline Solids, pp. 182–188 Nov. 3, 1994.

*Primary Examiner*—D. S. Nakarani
*Attorney, Agent, or Firm*—Keck, Mahin & Cate

[57] ABSTRACT

An ultraviolet and infrared absorbing glass plate includes a transparent glass substrate, a first layer formed on a first major surface of the glass substrate and a second layer formed on the first layer. The first layer is an ultraviolet and infrared absorbing film prepared by hardening a primer coating solution. The primer coating solution contains a synthetic resin, a fluorescent brightening agent, an ultraviolet absorbing agent and an infrared absorbing agent. The second layer is a film of a siloxane polymer. The glass plate has an optional water-repellent layer formed on a second major surface of the glass substrate. Long-wavelength ultraviolet rays until the upper limit of its wavelength can be substantially cut by the first layer on the glass substrate. Furthermore, the first layer is superior in infrared absorption, adhesion to the glass substrate, chemical resistance, abrasion resistance and durability.

11 Claims, 2 Drawing Sheets

GLASS PLATE WITH ULTRAVIOLET AND INFRARED ABSORBING FILM

BACKGROUND OF THE INVENTION

1. Field of the Invention

The present invention relates to an ultraviolet and infrared absorbing glass plate for use in buildings, vehicles, ships, airplanes and various display devices, and more particularly to a glass plate having an ultraviolet and infrared absorbing film and an optional water-repellent film which are formed thereon.

2. Description of the Prior Art

Hitherto, there have been two ways to provide a transparent body such as a glass substrate with an ultraviolet and infrared absorbing property. As a first way, an ultraviolet and infrared absorbing metal compounds are incorporated into a glass substrate (see JP-A-4-224133).

As a second way, at least one ultraviolet and infrared absorbing transparent film is formed on the surface of a glass substrate. For example, it is disclosed a laminated glass plate of which polyvinyl butyral interlayer film contains an ultraviolet and infrared absorbing agent (see JP-A-59-152249). Furthermore, it is disclosed that an ultraviolet and infrared cutting filter is formed on a glass substrate (see, for example, JP-B-4-44721 and JP-A-4-133004). In JP-A-4-133004, the UV and IR cuffing filter comprises a ZnO film formed on one side of a glass substrate and a multilayer coating which is formed on the ZnO film and/or the other side of the glass substrate. This multilayer coating is formed by alternately depositing transparent conductive oxidized rims and transparent dielectric films having a high refractive index. Still furthermore, it is disclosed a liquid phase coating method using a resin solution which contains an ultraviolet and infrared absorbing agent (see, for example, JP-A-4-160037 and JP-A-5-42622). Still furthermore, it is disclosed a liquid phase coating method using a resin solution in which an ultraviolet and infrared absorbing agent is dispersed (see, for example, JP-A-2-75683).

EP-A-0597391 discloses a glass plate with an ultraviolet absorbing coating formed thereon. This ultraviolet absorbing coating is prepared by hardening a primer coating solution comprising a synthetic resin, a fluorescent brightening agent and an ultraviolet absorbing agent.

There are various proposals for providing a transparent glass substrate with water repellency. For example, JP-B-50-15473 discloses a method of providing a non-porous substrate with water repellency by treating the substrate with a composition comprising dimethylpolysiloxane and one acid selected from the group consisting of sulfuric acid, phosphoric acid, aromatic sulfonic acids, aliphatic sulfonic acids and hydrochloric acid.

JP-B-60-21936 discloses a method of providing a glass plate with powder repellency and water repellency. In this method, at first, at least one silicon compound selected from the group consisting of methyltrimethoxysilane, dimethyldimethoxysilane, vinyltris($\beta$-methoxyethoxy) silane and N-($\beta$-aminoethyl)-$\gamma$-aminopropylmethyldimethoxysilane.

JP-A-3-247537 discloses a method of producing a water-repellent glass plate. In this method, at first, a glass substrate is treated with an abrasive. Then, a silicone water-repellent agent in which at least 5% of hydrogen atom of alkyl group of polydialkysiloxane has been replaced with fluorine atom is applied to the glass substrate so as to form a coating film thereon. Then, this coating film is hardened to form a water-repellent film having a thickness within a range from 0.1 to 2 µm.

JP-A-2-311332 discloses another method of producing a water-repellent glass plate. In this method, at least one silyl compound selected from the group consisting of chlorosilane compounds, alkoxysilane compounds and fluoroalkylsilane compounds.

SUMMARY OF THE INVENTION

It is an object of the present invention to provide a glass plate having a glass substrate and an ultraviolet and infrared absorbing film formed on the glass substrate, which film is colorless and transparent, substantially cuts long-wavelength ultraviolet rays until its upper limit (about 400 nm), and is superior in chemical resistance, abrasion resistance and durability.

According to the present invention, there is provided an ultraviolet and infrared absorbing glass plate comprising:

a transparent glass substrate;

a first layer formed on a first major surface of the glass substrate, said first layer being an ultraviolet and infrared absorbing film prepared by hardening a primer coating solution, said primer coating solution containing a synthetic resin, a fluorescent brightening agent, an ultraviolet absorbing agent and an infrared absorbing agent; and a second layer formed on said first layer, said second layer being a film of a siloxane polymer.

The ultraviolet and infrared absorbing glass plate according to the present invention optionally comprises a water repellent layer formed on a second major surface of the glass substrate.

According to the present invention, the water repellent layer is superior in chemical resistance, humidity resistance, heat resistance, weatherability, durability, water repellency and oil repellency. In the invention, even if a water-repellent coating solution which has been applied to the second major surface of the glass substrate, is heated at a temperature within a range from room temperature to about 200° C., the thus prepared water repellent layer is sufficiently large in the contact angle of water drop and sufficiently small in the angle of inclination of the glass plate where a water drop on the glass plate starts to fall down, and has a good balance between the contact angle and the angle of inclination.

According to the present invention, the fluorescence brightening agent is used for sharply cutting long-wavelength UV ray until its upper limit, and fluorescence emitted from the fluorescence brightening agent is absorbed and diminished by the UV absorbing agent. Therefore, according to the present invention, this fluorescence becomes unobtrusive to a viewer. Due to the provision of the siloxane polymer film (the second layer) on the first layer, the first layer becomes superior in chemical resistance, abrasion resistance and durability.

According to the invention, the infrared absorbing agent is incorporated in the primer coating solution, together with the ultraviolet absorbing agent. With this, the first layer on the glass substrate has both of the UV and IR absorbing functions. Therefore, according to the invention, it is possible to more economically provide a glass substrate with the UV and IR absorbing properties, as compared with conventional two films respectively having the UV absorbing property and the IR absorbing property. Furthermore, the first layer according to the present invention, which has the IR absorbing property due to the incorporation of the IR absorbing agent therein, is superior to a conventional IR-reflective layer formed by sputtering or the like, with respect to the production cost and the external appearance.

Still furthermore, some of the IR absorbing agents, for example, NIR-AM1 (trade name) made by Teikoku Kagaku Sangyo Co., are capable of absorbing the UV and visible light rays too as well as the IR absorption. In this case, the UV rays are more effectively cut by the first layer of the present invention, as compared with a case in which an IR absorbing agent is omitted (see Comparative Example 1).

DESCRIPTION OF THE PREFERRED EMBODIMENTS

In the following, an ultraviolet and infrared absorbing transparent glass plate according to the present invention will be described in detail. This glass plate according to the present invention has a transparent glass substrate having first and second major surfaces, an ultraviolet (UV) and infrared (IR) absorbing film formed on the first major surface of the glass substrate, and a silicone-based protective film formed on the UV and IR absorbing film.

The UV and IR absorbing film is formed by applying a primer coating solution to the first major surface of the transparent glass substrate, and then by hardening the primer coating solution through drying and heating of the solution. The protective film is formed by applying a silicone (siloxane resin). based hard coating solution to the hardened UV and IR absorbing film, and then by hardening the siloxane resin through drying and heating of the solution. In fact, a siloxane prepolymer of the solution is turned into a siloxane polymer through drying and heating of the solution.

It is an important feature of the present invention that a fluorescent brightening agent, an ultraviolet absorbing agent and an infrared absorbing agent are dissolved in the primer coating solution.

In the invention, the fluorescent brightening agent serves to sharply cut long-wavelength ultraviolet rays until the upper limit (about 400 nm) of the ultraviolet region. In general, a fluorescent brightening agent is defined as a material which absorbs UV rays and thereby emits fluorescence in the visible region. In the invention, the fluorescent brightening agent is not limited to a specific type, as long as it absorbs UV rays, emits fluorescence in the visible light region, can be dissolved in a synthetic resin (particularly acrylic) primer coating solution, is not modified by heating at a relatively low temperature, and has an absorption at the boundary (about 400 nm) between the ultraviolet and visible region. Examples of the fluorescent brightening agent of the invention are UVITEX-OB (trade name) which is 2,5-bis (5'-tertiary butyl benzo oxazolyl)thiophene and made by Ciba-Geigy Co., and EB-501 (trade name) which is made by Mitsui Toatsu Senryo Co, and NIKKAFLUOR SB, KB, EFS and OB (trade names) made by Nihon Kagaku Kogyo Co.

Examples of the UV absorbing agent capable of absorbing UV rays are benzophenone, benzotriazole, cyanoacrylate and salicylate.

Examples of the IR absorbing agent capable of absorbing IR rays are polymethylenes such as cyanin, pyrylium, squarylium, chroconium, azulenium, phthalocyanines, dithiol-metal complexes, naphthoquinones, anthraquinones, indophenols, azo-compounds, triallylmethanes, immoniums and diimmoniums.

The weight ratio of the UV absorbing agent to the fluorescent brightening agent is from about 0.5:1 to about 10:1, and more preferably from about 3:1 to about 6:1. The weight ratio of the IR absorbing agent to the fluorescent brightening agent is from about 0.3:1 to about 10:1, and more preferably from about 0.5:1 to about 6:1. If the amount of the fluorescent brightening agent is too large, transparency is impaired by fluorescence emitted from the fluorescence brightening agent. If it is too small, a satisfactory absorption of long-wavelength UV region is not obtained. It is preferable that the total weight of the UV and IR absorbing agents and the fluorescence brightening agent is within a range from 0.1 to 10 wt % based on the total weight of the primer coating solution. If the total weight of these three agents is excessive, the production process becomes uneconomical.

In the preparation of the synthetic resin (particularly acrylic) primer coating solution, it is preferable to use a mixed solvent of ether alcohol solvent such as ethyl cellosolve, and ketone alcohol solvent such as diacetone alcohol, ketone solvent, ether solvent or aromatic compound solvent, for the purpose of sufficiently dissolving therein the UV and IR absorbing agents and the fluorescence brightening agent and not damaging the glass substrate. In particular, in case that the glass substrate is an inorganic glass substrate, it is preferable to use ketone solvents such as cyclohexanone and aromatic solvents such as toluene.

Examples of the synthetic resins are acrylic resin, urethane resin, fluororesin and polyester resin. For example, as acrylic resin, ACRYLIC BR RESIN (trade name) made by Mitsubishi Rayon Co. can be used. It is preferable that the synthetic resin concentration of the primer coating solution is from about 1 to about 15 wt %, that viscosity of the primer coating solution is from about 10 to about 1000 cP, and that the thickness of the film of the primer coating solution is from about 0.5 to about 10 μm. The thickness of the protective film is preferably from about 1 to about 5 μm. Thus, the total thickness of the UV and IR absorbing film and the protective film is preferably from about 2 to about 15 μm.

For the purpose of improving adhesion of the UV and IR absorbing film to the glass substrate, it is preferable to add a silane coupling agent such as OS808A (trade name) which is a silicone-modified acrylic resin solution made by Daihachi Chemical Co. to the primer coating solution in the amount of about 0.25 wt % to about 60 wt % based on the total weight of the primer coating solution. That is, the weight ratio of the silane coupling agent to the synthetic resin in the primer coating solution is within a range from about 0.25:1 to about 4:1. If the amount of the silane coupling agent is too small, adhesion of the UV and IR absorbing film to the glass substrate becomes insufficient. If its amount is too large, the production process becomes uneconomical.

The primer coating solution is applied to the glass substrate by, for example, dip coating, spray coating, flow coating or printing so as to form a film on the glass substrate. Then, the coated glass substrate is heated, for example, at a temperature not lower than about 80° C. for about 1 hr so as to dry and harden the film. If this heating is insufficient, the component(s) of the primer coating solution tends to be released into the protective film, thereby causing cloud or crack. If the heating is too much, the adhesion of the protective film to the UV and IR absorbing film tends to be impaired.

The silicone hard coating solution for the protective film is preferably basically an alcohol solution of a siloxane prepolymer which is obtained by hydrolyzing an organoalkoxysilane. It is more preferable to add a colloidal silica to the hard coating solution so as to improve abrasion resistance of the protective film. Examples of commercial products of the silicone hard coating solution are TOSGUARD 510 (trade name) made by Toshiba Silicone Co. and Si COAT 2 (trade name) made by Daihachi Chemical Co.

It is preferable that the hard coating solution is applied to the hardened UV and IR absorbing film at a temperature ranging from about 15° to about 25° C. at a relative humidity ranging from about 40 to about 50% with a cleanliness class, defined in U.S. Federal Specifications and Standards 209B and National Aeronautics and Space Administration Standards NHB 5340.2, not larger than about 10,000. The hard coating solution is applied by, for example, dip coating, spray coating, flow coating or printing so as to form the protective film which is uniform in thickness. The thickness of the protective film is preferably from about 1 to about 5 µm. If it is too thin in thickness, protection by the protective film becomes insufficient. If it is too thick in thickness, the protective film may have cracks during heating. The glass substrate coated with the protective film is heated at a temperature preferably within a range from about 80° to about 200° C. so as to harden the protective film. If the glass plate is an inorganic glass plate, it is preferable that the heating temperature is about 150° C. and that the heating time is about 2 hr. With this, hardness of the protective film becomes sufficient. Due to the formation of the protective film on the UV and IR absorbing film, the UV and IR absorbing film becomes superior in chemical resistance, abrasion resistance and durability.

It is optional to add a certain amount of a flow improving agent or a rheology control agent to the acrylic primer coating solution and the silicone hard coating solution so as to improve applicability thereof.

The transparent glass substrate may be an inorganic or resin glass. The shape and the size of the glass substrate is not particularly limited. For example, the glass substrate may be a curved glass plate, a tempered glass plate, a single glass plate, a multiple glass plate or a laminated glass plate.

Figure 2:
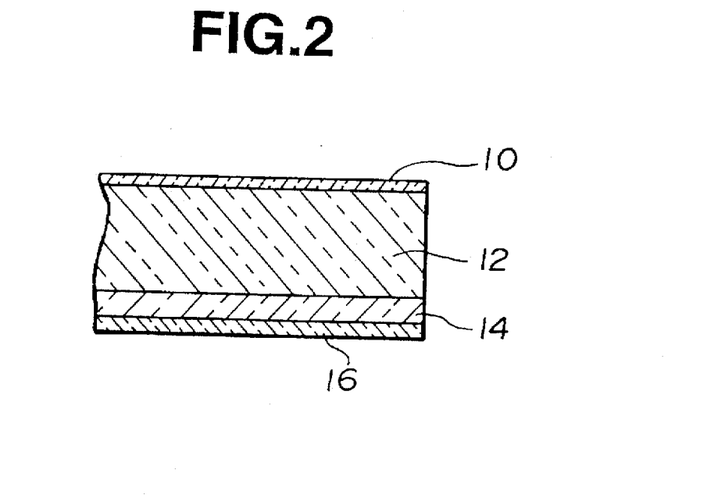
FIG. 2 is a sectional and partial view showing a glass plate according to Examples 6–13 of the present invention.

As is seen from FIG. 2, according to the present invention, a water repellent film 10 is optionally formed on the other major surface of the glass substrate 12, in addition to the UV and IR absorbing film 14 and the protective film 16. The type of this water repellent film is not particularly limited as long as it shows a good water repellency. However, it is preferable to use a water repellent film which has a large contact angle of water drop placed thereon, a small angle of inclination of the glass substrate where a water drop starts to fall down, and a good balance between the contact angle and the angle of inclination. Furthermore, it is preferable to use a water repellent film which is superior in chemical resistance, humidity resistance, weatherability, durability and oil repellency, and which is not damaged by the contact with the hard coating solution and the primer coating solution.

In the invention, the water repellent film is prepared by hardening the hard coating solution containing a water repellent agent. This agent comprises a silicon isocyanate, a fluoroalkylsilane, and an optional alkylsilane. It is preferable that the coating solution further contains a diluting solvent and an acid catalyst (e.g. nitric acid and/or oxalic acid).

The hard coating solution is prepared, for example, by mixing from about 0.1 to about 5 (preferably from about 0.5 to about 2) parts by weight of the fluoroalkylsilane and from about 0.1 to about 15 (preferably from about 0.5 to about 10 and more preferably from about 0.5 to about 6) parts by weight of the optional alkylsilane, then diluting this mixture with 90–110 parts by weight of the diluting solvent, then adding 0.1 to 5 (preferably from about 0.5 to about 2) parts by weight of the acid catalyst to this diluted mixture, and then adding 0.1–10 (preferably 0.5–2) parts by weight of the silicon isocyanate to the mixture.

The hard coating solution is adjusted to have a viscosity within a range from 0.5 to 6 cP, for the purpose of obtaining a water repellent film which has the optically uniform thickness (e.g. up to 30 nm) even if a glass substrate is coated with the coating solution with hands. The coating method is not particularly limited. The coating method may be a coating with hands or brush, dip coating, spray coating, flow coating, printing, or a coating by rubbing cloth or paper moistened with the coating solution, against the glass substrate. The viscosity is preferably within a range from about 0.5 to about 5 cP and more preferably from about 0.5 to about 4 cP.

If the fluoroalkylsilane and the optional alkylsilane which are in amounts more than the above ranges are used in the preparation of the coating solution, the production process becomes uneconomical and it becomes difficult to obtain the uniform thickness of the water repellent film, by a coating with hands or brush. In contrast, if the amounts of the fluoroalkylsilane and the optional alkylsilane are within the above ranges, the water repellent film becomes superior in water repellency, and particularly in the contact angle of water drop and the angle of inclination of the glass substrate and the balance between these angles.

Examples of the fluoroalkylsilane are $CF_3(CH_2)_2Si(OCH_3)_3$, $CF_3(CH_2)_2SiCl_3$, $CF_3(CF_2)_5(CH_2)_2Si(OCH_3)_3$, $CF_3(CF_2)_5(CH_2)_2SiCl_3$, $CF_3(CF_2)_7(CH_2)_2Si(OCH_3)_3$, $CF_3(CF_2)_7(CH_2)_2SiCl_3$, $CF_3(CF_2)_7(CH_2)_2SiCH_3Cl_2$, and $CF_3(CF_2)_7(CH_2)_2SiCH_3(OCH_3)_3$. Of these, $CF_3(CF_2)_7(CH_2)_2Si(OCH_3)_3$ is a preferable example.

Examples of the alkylsilane are $CH_3(CH_2)_5Si(OCH_3)_3$ (n-hexyltrimethoxysilane), $CH_3(CH_2)_{11}Si(OC_2H_5)_3$ (n-dodecyltriethoxysilane), $(CH_3)_2CHCH_2Si(OCH_3)_3$ (isobutyltrimethoxysilane), $CH_3(CH_2)_5SiCl_3$, $CH_3(CH_2)_7SiCl_3$, and $(CH_3)_2CHCH_2SiCl_3$. These examples having long chain structures or long and short chain structures contribute to make water drops easily fall down the water repellent film. Of these examples, the first three compounds are preferable examples.

If the amount of the silicon isocyanate is more than the above range (0.1–10 parts by weight), the water repellent film becomes inferior in the contact angle and the angle of inclination of the glass substrate. If the amount of the silicon isocyanate is within the above range, it is possible to use, as the hardening temperature, a relatively low temperature, for example, within a range from room temperature to about 200° C., preferably from room temperature to about 180° C. for the purpose of forming the water repellent film having satisfactory properties. In the invention, room temperature can be as low as about 5° C. Within the above range, for example, about 100° C. or about 80° C. may be taken as the hardening temperature. If the amount of the silicon isocyanate is within the above preferable range (0.5–2 parts by weight), Si——Si bond is formed in the presence of a small mount of water even under room temperature by the reaction of the silicon isocyanate with Si—OH of the glass substrate.

With this, adhesion between the water repellent film and the glass substrate becomes very strong.

Examples of the silicon isocyanate are substituted and unsubstituted $CH_3Si(NCO)_3$ (methylsilyltriisocyanate), $(CH_3)_3SiNCO$, $(CH_3)_3Si(NCO)_3$, $CH_2=CHSi(NCO)_3$, phenyl-$Si(NCO)_3$, $Si(NCO)_4$, and $C_2H_5OSi(NCO)_3$. Of these examples, substituted and unsubstituted $CH_3Si(NCO)_3$ are preferable examples.

If the amount of the acid catalyst is more than the above range (0.1–5 parts by weight), it becomes difficult to obtain the desired contact angle of water drop. Examples of the acid catalyst are inorganic acids such as nitric acid, hydrochloric acid and sulfuric acid, dicarboxylic acids such as oxalic acid, hexafluoroglutaric acid, and organic acids such as para-toluene-sulfonic acid and trifluoroacetic acid. Of these, preferable examples are oxalic acid and nitric acid.

The water repellent film is prepared by applying the hard coating solution to the glass substrate and then heating the coated glass substrate at a temperature within a range from room temperature to about 200° C. so as to form the water repellent film having a thickness up to about 50 nm and preferably within a range from monomolecular film's thickness or about 5 nm to about 30 nm. If the heating temperature is higher than 200° C., the desired contact angle can not be obtained. If the heating temperature is lower than room temperature, durability of the water repellent film becomes inferior. The heating temperature is preferably within a range from room temperature to about 180° C. Within this range, for example, a heating temperature of about 160° C., about 100° C. or about 80° C. may be taken. If a heating temperature of about 180° C. is taken, the heating (hardening) time is within about 5 min. If the heating temperature is room temperature, the hardening time is within about 24 hr. In the invention, the UV and IR absorbing film and the water repellent film may be hardened at one time. This makes the production process more effective and more economical.

The diluting solvent for preparing the water repellent film is not particularly limited as long as the silicon isocyanate, the fluoroalkylsilane and the optional alkylsilane are uniformly dissolved in the diluting solvent. Examples of the diluting solvent are lower alcohols such as ethanol, butanol and isopropyl alcohol, ketones such as acetone, methylethylketone and methylisobutylketone, cellosolves such as methyl cellosolve and ethyl cellosolve, aromatic hydrocarbons such as xylene and toluene, aliphatic hydrocarbons such as n-hexane and n-heptane, and esters such ethyl acetate and butyl acetate.

The following examples are illustrative of the present invention, but these examples are not limitative. In the following examples and comparative examples, the amount of each component of the primer coating solution will be expressed by wt % based on the total weight of the primer coating solution, unless otherwise stated.

EXAMPLE 1

In this example, the UV and IR absorbing film was formed on a glass substrate and then the protective film was formed on the UV and IR absorbing film as follows.

The preparation of the UV and IR absorbing acrylic primer coating solution for the application to a glass substrate will be explained in the following. At first, a round bottom flask equipped with a stirrer and a condenser was charged with 43.5 wt % of cyclohexanone and 40.0 wt % of propylene glycol monomethyl ether. Then, 5 wt % of an acrylic resin, DIANAL BR-88 (trade name) made by Mitsubishi Rayon Co., was added to the mixture while the mixture was stirred at room temperature. Then, 0.2 wt % of the fluorescent brightening agent, UVITEX-OB (trade name) made by Ciba-Geigy Co., 0.8 wt % of the UV absorbing agent, TINUVIN 327 made by Ciba-Geigy Co., and 0.5 wt % of the IR absorbing agent, NIR-AM1 (trade name) made by Teikoku Kagaku Sangyo Co. were added to the mixture while the mixture was stirred. Then, the flask was put in an oil bath so as to raise the temperature of the mixture up to about 95° C. by spending about 30 min and then to maintain the temperature at about 95° C. for about 30 min. After the mixture was allowed to cool down to room temperature, 10 wt % of silicone-modified acrylic resin (OS-808A (trade name)) as an agent for improving adhesion of the UV and IR absorbing film to the glass substrate was added to the mixture, and then the mixture was stirred to dissolve the same in the mixture. The thus prepared primer coating solution was transparent, and contained 10 wt % of solid matter. Its viscosity was 260 cP (at 25° C.).

The preparation of the silicone hard coating solution will be explained in the following.

A 500 ml round bottom flask equipped with a stirrer and a condenser was charged with 100 g of methyltriethoxysilane and 10 g of 3-glycidoxypropyltrimethoxysilane. Then, 0.04 g of phthalic anhydride was added to the mixture. The flask was heated in a water bath at a temperature of about 40° C. so as to dissolve phthalic anhydride in the mixture. Then, 100 g of weakly basic colloidal silica solution, SNOW TEX C (trade name) which is made by Nissan Chemical Co., and has an average particle size of about 15 μm and a $SiO_2$ content of about 20%, was added to the mixture. The reaction was continued for about 5 days at a temperature of about 40° C., thereby obtaining a first composition having a number average molecular weight of about 1100 and a solid content of about 29%. The number average molecular weight was measured by gel permeation chromatography (GPC). Then, 145 g of isopropyl alcohol was added to the first composition. Then, this mixture was concentrated by the ultrafilter of nominal molecular weight limit of 1000, thereby obtaining a second composition having a number average molecular weight of about 1200 and a solid content of about 20%. About 0.1 parts by weight of dicyandiamide as a hardening catalyst was added to the second composition, thereby obtaining the silicone hard coating solution.

The application of the UV and IR absorbing acrylic primer coating solution and the silicone hard coating solution will be explained in the following.

A clear float glass substrate having widths of 300 mm and a thickness of about 3 mm was washed with a neutral detergent, rinsed with water and further with alcohol, dried and wiped with acetone. One surface of the glass substrate was masked with a film. Then, the glass substrate was dipped in the UV and IR absorbing acrylic primer coating solution and then withdrawn at a speed of about 0.1 cm/sec. Then, the glass substrate was dried at a temperature of about 120° C. for about 0.5 hr, thereby obtaining the glass substrate with the ultraviolet absorbing film having a thickness of about 6 μm. Then, the glass substrate was dipped in the silicone hard coating solution and then withdrawn at a speed of about 1 cm/sec. Then, the glass substrate was dried at a temperature of about 120° C. for about 0.5 hr and then at a temperature of about 150° C. for about 0.5 hr, thereby forming the protective layer having a thickness of about 3 μm.

Figure 1:
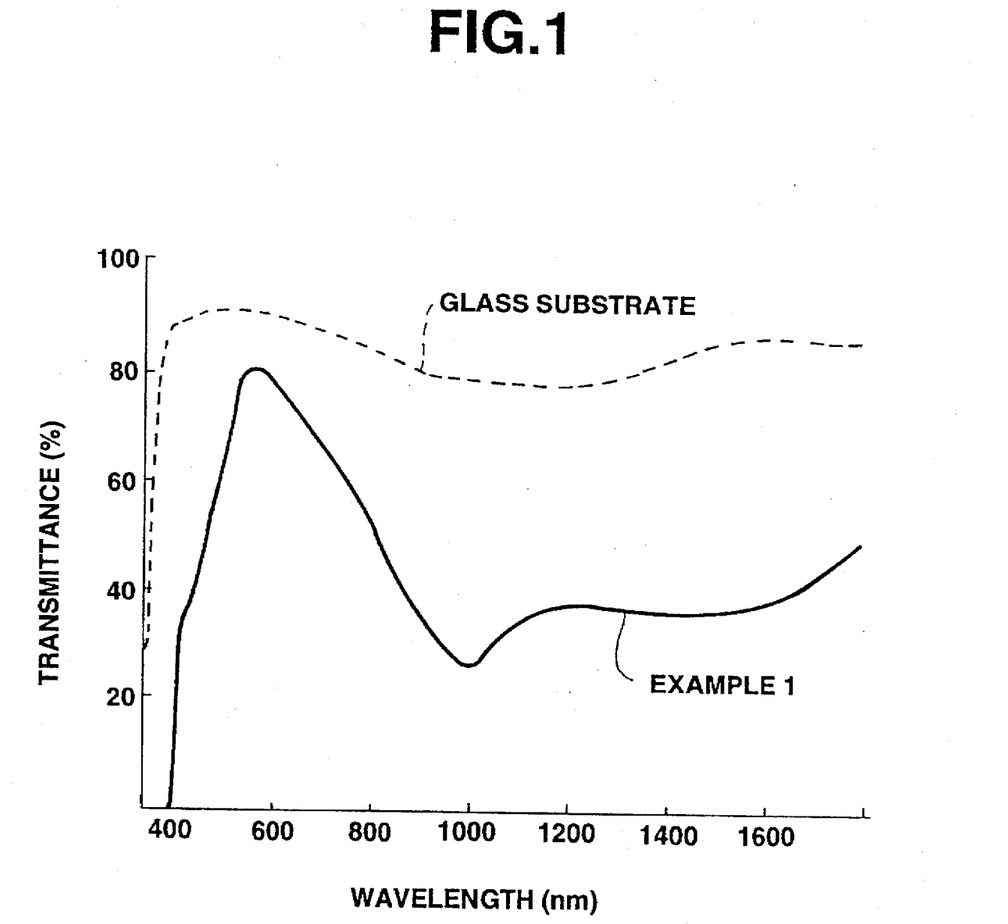
FIG. 1 is a graph showing a relationship between wavelength and transmittance with respect to a glass substrate (a float glass having a thickness of 3 mm) itself and a glass plate according to Example 1 of the present invention.

On the samples of the coated glass substrate, the transmittance for the UV and IR rays was measured with a spectrophotometer. The result is shown in FIG. 1. As is shown in FIG. 1, the transmittance for long-wavelength ultraviolet rays (up to about 400 nm) was almost 0% and the solar radiation transmittance was not higher than 50%. The coated glass substrate had a slightly green color. The coated glass substrate was observed outdoors with the naked eye under the natural sunshine to check the fluorescence and cloud. With this, the coated glass substrate had no fluorescence nor cloud.

The surface hardness of the protective film was examined according to ASTM D1044. The test was continued until 500 turns of abrading wheels of CS-10F type on the surface of the protective film. After the test, the haze value (DH, %) of each specimen was measured. The result of the haze value was 5% which indicates a superior abrasion resistance.

The adhesion strength was tested by the cross-cut adhesion test according to JIS K 5400.

Chemical (acid) resistance was tested by dropping 25 wt % sulfuric acid to the samples. 24 hr after the dropping, the surface state of the samples was observed with the naked eye. Chemical (alkali) resistance was tested by dropping 5 wt % NaOH to the samples. 4 hr after the dropping, the surface state of the samples was observed with the naked eye. Chemical (solvent) resistance was tested by dropping 100% ethanol to the samples. 4 hr after the dropping, the surface state of the samples was observed by the naked eye. The results of the chemical resistance tests indicated no change in the surface state of the samples by observation with the naked eye.

Weatherability was tested with a sunshine carbon weathermeter in accordance with JIS D 0205. The time until abnormality such as cracks, exfoliation and substantial yellowing is observed by the naked eye was measured. As the result, the abnormality was not observed even with over 3000 hr testing.

EXAMPLE 2

In this example, Example 1 was repeated except in that the mount and type of components of the primer coating solution were modified as follows and that the method of preparing the protective film was modified as follows.

In the preparation of the primer coating solution, 7 wt % of DIANAL BR88 (trade name) made by Mitsubishi Rayon Co., 0.2 wt % of UVITEX-OB, 0.8 wt % of TINUVIN327, 0.1 wt % of SIR159 (trade name) made by Mitsui Toatsu Fine Co. as the infrared absorbing agent, 41.9 wt % of cyclohexanone, 40.0 wt % of propylene glycol monomethyl ether, and 10 wt % of OS808A were used. The prepared primer coating solution contained 11 wt % of solid matter. Its viscosity was 350 cP.

In place of a silicone hard coating solution according to Example 1, a commercial silicone hard coating solution called TOSGUARD 510 made by Toshiba Silicone Co. was used. The glass substrate coated with the UV and IR absorbing film was dipped in the silicone hard coating solution, and then withdrawn at a speed of about 1 cm/sec. Then, the glass plate was dried at a temperature of about 120° C. for about 3 hr, thereby obtaining a protective film on the UV and IR absorbing film. The thicknesses of the UV and IR absorbing film and the protective film were 7 μm and 3 μm, respectively. The same evaluation tests as those of Example 1 were conducted. Similar to Example 1, the results of the tests were satisfactory.

EXAMPLE 3

In this example, Example 2 was repeated except in that the amount and type of components of the primer coating solution were modified as follows.

In the preparation of the primer coating solution, 4 wt % of DIANAL BR88, 0.3 wt % of UVITEX-OB, 1.0 wt % of TINUVIN327, 1.0 wt % of NIR-AM1, 38.7 wt % of cyclohexanone, 40.0 wt % of propylene glycol monomethyl ether, and 15 wt % of OS808A were used. The prepared primer coating solution had 12 wt % of solid matter. Its viscosity was 250 cP (at 25° C.). The thicknesses of the UV and IR absorbing film and the protective film were 6 μm and 3 μm, respectively. The same evaluation tests as those of Example 1 were conducted. Similar to Example 1, the results of the tests were satisfactory.

EXAMPLE 4

In this example, Example 1 was repeated except in that a polycarbonate (PC) substrate having a thickness of about 3 mm was used in place of a glass substrate of Example 1 and that a first, a round bottom flask equipped with an stirrer and a method of preparing the primer coating solution was modified as follows.

In the method of preparing the primer coating solution, at condenser was charged with 58.3 wt % of cyclohexanone and 37.0 wt % of diacetone alcohol. Then, 3 wt % of an acrylic resin, ACRYLIC BR-85 RESIN (trade name) made by Mitsubishi Rayon Co., was added to the mixture while the mixture was stirred at room temperature. Then, 0.3 wt % of UVITEX-OB, 1.2 wt % of TINUVIN 327, and 0.2 wt % of the IR absorbing agent, PA1001 (trade name) made by Mitsui Toatsu Fine Co. were added to the mixture while the mixture was stirred. Then, the flask was put in an oil bath so as to raise the temperature of the mixture up to about 95° C. by spending about 30 min. Then, the temperature was maintained at about 95° C. for about 30 min for dissolving each component. The thus prepared primer coating solution was transparent, and contained 8 wt % of solid matter. Its viscosity was 180 cP (at 25° C.). The thicknesses of the UV and IR, absorbing film and the protective film were 4 μm and 3 μm respectively. The same evaluation tests as those of Example 1 were conducted. Similar to Example 1, the results of the tests were satisfactory.

EXAMPLE 5

In this example, Example 4 was repeated except in that the amount and type of components of the primer coating solution was modified as follows.

In the preparation of the primer coating solution, 5 wt % of DIANAL BR85 (trade name) made by Mitsubishi Rayon Co. 0.2 wt % of UVITEX-OB, 1.0 wt % of TINUVIN327, 1.0 wt % of PA1001, 62.8 wt % of cyclohexanone and 30.0 wt % of diacetone alcohol were used. In fact, OS808A was omitted.

The prepared primer coating solution had 10 wt % of solid matter. Its viscosity was 250 cP (at 25° C.). The thicknesses of the UV and IR absorbing film and the protective film were 6 μm and 3 μm, respectively. The same evaluation tests as those of Example 1 were conducted. Similar to Example 1, the results of the tests were satisfactory.

Comparative Example 1

In this comparative example, Example 1 was repeated except that the IR absorbing agent was omitted and 44.0 wt % of cyclohexanone was used in the preparation of the primer coating solution. The prepared primer coating solution had 10 wt % of solid matter. Its viscosity was 250 cP (at 25° C.). The thicknesses of the UV and IR absorbing film and the protective film were 6 μm and 3 μm, respectively.

The obtained UV and IR absorbing glass plate had a good external appearance. However, long-wavelength UV rays were not completely cut by the glass plate, and the solar radiation transmittance was not lower than 90%. Thus, the results of the tests were unsatisfactory.

Comparative Example 2

Example 1 was repeated except that the ultraviolet absorbing agent was omitted and 44.3 wt % of cyclohexanone was used in the preparation of the primer coating solution. The prepared primer coating solution had 10 wt % of solid matter. Its viscosity was 250 cP (at 25° C.). The thicknesses of the UV and IR absorbing film and the protective film were 6 μm and 3 μm, respectively.

The obtained UV and IR absorbing glass plate had a slight bluish fluorescence. Visible light rays which are in the near UV region were partly cut by the glass plate. However, Long wavelength UV rays until the upper limit (about 400 nm) were not completely cut by the glass plate. In the weatherability test, the abnormality was observed with about 300 hr testing. Thus, the test results were unsatisfactory.

Comparative Example 3

Example 1 was repeated except that the fluorescence brightening agent was omitted and 43.7 wt % of cyclohexanone was used in the preparation of the primer coating solution. The prepared primer coating solution had 10 wt % of solid matter. Its viscosity was 250 cP (at 25° C.). The thicknesses of the UV and IR absorbing film and the protective film were 6 μm and 3 μm, respectively.

The light rays having wavelengths of about 400 nm were not sufficiently cut by the obtained UV and IR absorbing glass plate. In the weatherability test, the abnormality was observed with about 1000 hr testing. Thus, the test results were unsatisfactory.

Comparative Example 4

Example 1 was repeated except that the fluorescence brightening agent and the UV absorbing agent were omitted and 44.5 wt % of cyclohexanone was used in the preparation of the primer coating solution. The prepared primer coating solution had 10 wt % of solid matter. Its viscosity was 250 cP (at 25° C.). The thicknesses of the UV and IR absorbing film and the protective film were 6 μm and 3 μm, respectively.

The obtained UV and IR absorbing glass plate did not have a capability of cutting UV rays. In the weatherability test, the abnormality was observed with about 500 hr testing.

In each of the following Examples 6–13 and Comparative Examples 5–7, the water repellent film was formed on a glass plate as well as the UV and IR absorbing film and the protective film.

EXAMPLE 6

In this example, Example 1 was repeated except in that the water repellent film was additionally formed on the other major surface of a glass substrate, whereas the UV and IR absorbing film and the protective film of Example 1 were formed on one major surface of the glass substrate.

A coating solution for forming the water repellent film on the glass substrate was prepared as follows. At first, 1 part by weight of $CF_3(CF_2)_7(CH_2)_2Si(OCH_3)_3$ (TSL8233 (trade name) made by Toshiba Silicone Co.) as the fluoroalkylsilane was diluted with 100 parts by weight of ethanol. Then, 2 parts by weight of oxalic acid as the acid catalyst was added to this mixture. Then, this mixture was stirred for about 30 min at room temperature. Then, 1 part by weight of $CH_3Si(NCO)_3$ (SIC003 (trade name) made by Matsumoto Seiyaku Co.) as the silicon isocyanate was added to the mixture. Then, the mixture was stirred for about 5 min. With this, the water-repellent coating solution having a viscosity of about 2 cP (at 25° C.) was obtained.

A method of forming the water-repellent film on the glass substrate will be described in the following. At first, a tissue paper moistened with the water-repellent coating solution was rubbed against the other major surface of the glass substrate. Then, this coated major surface was washed with water and then dried with alcohol. Then, the coated glass substrate was allowed to stand still for 1 hr at room temperature so as to harden the water-repellent film. With this, the water-repellent film having a thickness of about 10 nm was formed on the glass substrate.

After the formation of the water-repellent film on the other major surface of the glass substrate, the UV and IR absorbing film was formed on the one surface of the glass substrate as in Example 1, without masking the water repellent film.

In fact, after the glass substrate was withdrawn from the primer coating solution, this coating solution did not remain on the water repellent film. Furthermore, the water repellent film was not damaged by the dip of the glass substrate in the primer coating solution. This phenomena was also found in each of the following Examples 7–13 in each of which the water repellent film was not masked. Therefore, we found that it is not necessary to mask the water repellent film before the formation of the UV and IR absorbing film. The UV and IR absorbing film having a thickness of about 6 μm was formed on the one major surface of the glass substrate.

After the formation of the UV and IR absorbing film, the protective film was formed on the UV and IR absorbing film as in Example 1, without masking the water repellent film. In fact, after the glass substrate was withdrawn from the coating solution for the protective film, this coating solution did not remain on the water repellent film. Furthermore, the water repellent film was not damaged by the dip of the glass substrate in this coating solution. This phenomena was also found in each of the following Examples 7–13 in each of which the water repellent film was not masked. Thus, the protective film having a thickness of about 3 μm was formed on the UV and IR absorbing film.

In addition to the same evaluation tests as those of Example 1, the contact angle of a water drop which has a diameter of about 3 mm and placed on the water repellent film was measured with a Contact Angle Meter (CA-DT-A type) made by Kyowa Kaimen Kagaku Co. Furthermore, the angle of inclination of the glass plate, where a water drop which has a diameter of about 5 mm and placed on the water repellent film starts to fall down, was measured with the same Contact Angle Meter. The above-mentioned contact angle and the angle of inclination (the inclination angle) were respectively measured, at a time after the formation of the water repellent film but before the dip of the glass substrate in the primer coating solution. In this case, the both angles will be referred to as "the initial water repellency", as in Table. Furthermore, the contact angle and the inclination angle were respectively measured, at a time after the formation of the protective film on the UV and IR absorbing film. In this case, the both angles will be referred to as "the final water repellency", as in Table.

Figure 3:
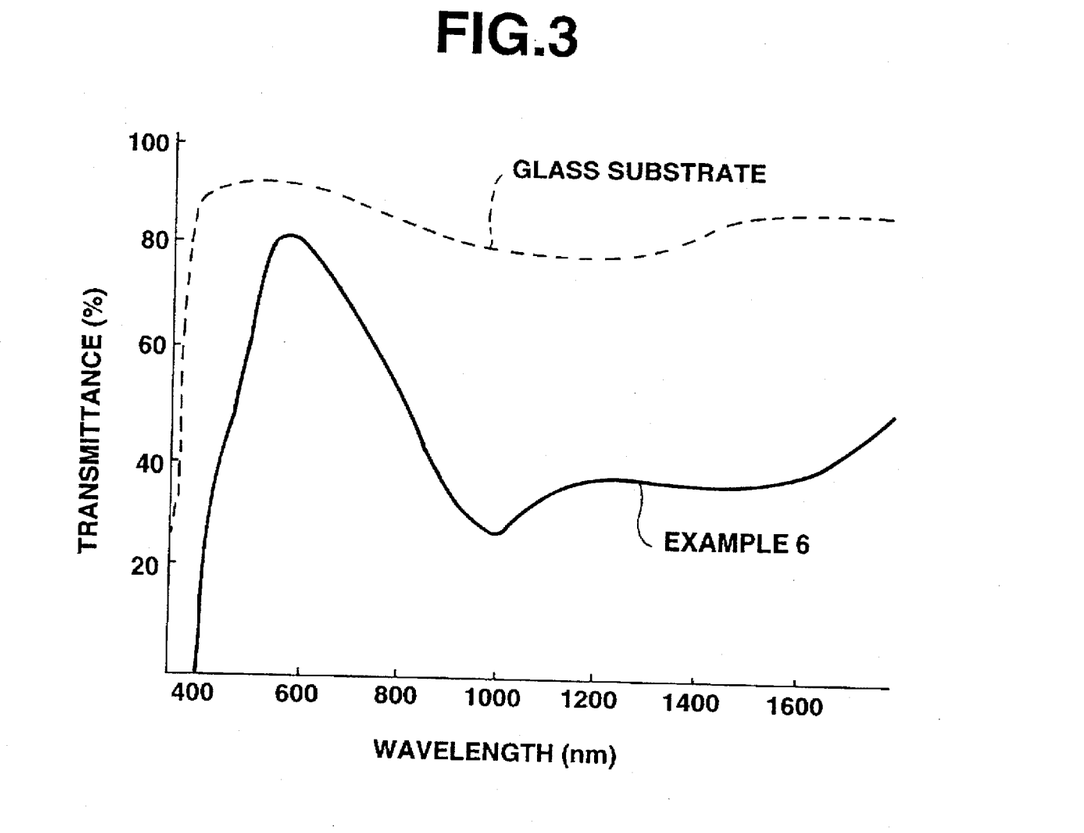
FIG. 3 is a graph similar to FIG. 1, but with respect to the glass substrate itself and a glass plate according to Example 6 of the present invention.

The result of the transmittances for the UV and IR rays is shown in FIG. 3. As shown in FIG. 3, the transmittance for long-wavelength ultraviolet rays (up to about 400 nm) was almost 0% and the solar radiation transmittance was not higher than 50%. The glass plate as a final product had a slightly green color. The glass plate had no fluorescence nor cloud. The result of the haze value was 5% which indicates a superior abrasion resistance. The results of the chemical resistance tests indicated no change in the surface state of the samples by observation with the naked eye. In the weatherability test, the abnormality was not observed even with over 3000 hr testing.

EXAMPLE 7

In this example, Example 2 was repeated except in that a water repellent film was additionally formed on the other major surface of the glass substrate, whereas the UV and IR absorbing film of Example 2 and the protective film of Example 2 were formed on one major surface thereof.

A method of forming the water repellent film will be described in the following. At first, a tissue paper moistened with the water-repellent coating solution of Example 6 was rubbed against the other major surface so as to form the water repellent film thereon. Then, the film was washed with water and then dried with alcohol. Then, the film was heated at a temperature of about 180° C. for about 5 min so as to harden the film. With this, the water repellent film having a thickness of about 10 nm was obtained.

The prepared primer coating solution had 11 wt % of solid matter. Its viscosity was 350 cP (at 25° C.). The thicknesses of the UV and IR absorbing film and the protective film were 7 μm and 3 μm, respectively.

The same evaluation tests as those of Example 6 were conducted. The coated glass substrate had a slightly brown color. However, the transmittance for long-wavelength ultraviolet rays. (up to about 400 nm) was almost 0% and the solar radiation transmittance was not higher than 80%. The coated glass substrate had no fluorescence nor cloud. The result of the haze value was 6% which indicates a superior abrasion resistance. The results of the chemical resistance tests indicated no change in the surface state of the samples by observation with the naked eye. In the weatherability test, the abnormality was not observed even with over 3000 hr testing.

EXAMPLE 8

In this example, Example 3 was repeated except in that a water repellent film was additionally formed on the other major surface of the glass substrate, whereas the UV and IR absorbing film of Example 3 and the protective film of Example 3 were formed on one major surface thereof.

In fact, the water repellent film was formed in accordance with Example 6. The obtained water-repellent film had a thickness of about 10 nm.

The prepared primer coating solution had 12 wt % of solid matter. Its viscosity was 250 cP (at 25° C.). The thicknesses of the UV and IR absorbing film and the protective film were 6 μm and 3 μm, respectively.

The same evaluation tests as those of Example 6 were conducted. The coated glass substrate had a slightly green color. However, the transmittance for long-wavelength ultraviolet rays (up to about 400 nm) was almost 0% and the solar radiation transmittance was not higher than 50%. The coated glass substrate had no fluorescence nor cloud. The result of the haze value was 5% which indicates a superior abrasion resistance. The results of the chemical resistance tests indicated no change in the surface state of the samples by observation with the naked eye. In the weatherability test, the abnormality was not observed even with over 3000 hr testing.

EXAMPLE 9

In this example, Example 6 was repeated except in that the amount and type of components of the primer coating solution were modified as follows. The primer coating solution was prepared by using 4 wt % of DIANAL BR85, 0.3 wt % of UVITEX-OB, 1.0 wt % of TINUVIN327, 1.0 wt % of PA1001, 47.7 wt % of cyclohexanone, 40.0 wt % of propylene glycol monomethyl ether, and 6 wt % of OS808A.

The prepared primer coating solution contained 8 wt % of solid matter and had a viscosity of 200 cP. The obtained water repellent film, the UV and IR absorbing film and the protective film were respectively about 10 nm, about 5 μm and about 3 μm in thickness.

The same evaluation tests as those of Example 6 were conducted. The coated glass substrate had a slightly gray color. However, the transmittance for long-wavelength ultraviolet rays (up to about 400 nm) was almost 0% and the solar radiation transmittance was not higher than 70%. The coated glass substrate had no fluorescence nor cloud. The result of the haze value was 5% which indicates a superior abrasion resistance. The results of the chemical resistance tests indicated no change in the surface state of the samples by observation with the naked eye. In the weatherability test, the abnormality was not observed even with over 3000 hr testing.

EXAMPLE 10

In this example, Example 6 was repeated except in that another water-repellent coating solution was used. In fact, a method of preparing this coating solution was substantially the same as that of Example 6, except in that 0.5 parts by weight of 60% nitric acid was used as the acid catalyst in place of oxalic acid and that 2 parts by weight (in place of 1 part by weight) of $CH_3Si(NCO)_3$ as the silicon isocyanate was used. The prepared coating solution has a viscosity of about 1 cP at 25° C.

The prepared primer coating solution had 10 wt % of solid matter. Its viscosity was 260 cP (at 25° C.). The obtained water repellent film, the UV and IR absorbing film and the protective film were respectively about 8 nm, about 6 μm and about 3 μm in thickness.

The same evaluation tests as those of Example 6 were conducted. Similar to Example 6, the results of the tests were satisfactory.

EXAMPLE 11

In this example, Example 6 was repeated except in that another water-repellent coating solution was used.

A method of preparing this coating solution will be described in the following. At first, 0.5 parts by weight of $CF_3(CF_2)_7(CH_2)_2Si(OCH_3)_3$ (TSL8233 (trade name) made by Toshiba Silicone Co,) was mixed with 5 parts by weight of n-hexyltrimethoxysilane, Then, this mixture was diluted with 100 parts by weight of ethanol. Then, 1 part by weight of 60% nitric acid as the acid catalyst was added to the diluted mixture. Then, this mixture was stirred for about 30 min at room temperature. Then, 1 part by weight of $CH_3Si(NCO)_3$ ($SIC_{003}$ made by Matsumoto Seiyaku Co.) was added to the mixture. Then, this mixture was stirred for about 5 min. With this, the water-repellent coating solution having a viscosity of about 3 cP (at 25° C.) was obtained.

The obtained water repellent film, the UV and IR absorbing film and the protective film were respectively about 15 nm, about 6 μm and about 3 μm in thickness.

The same evaluation tests as those of Example 6 were conducted. Similar to Example 6, the results of the tests were satisfactory.

EXAMPLE 12

In this example, Example 6 was repeated except in that another water-repellent coating solution was used.

A method of preparing this coating solution will be described in the following. At first, 1 part by weight of $CF_3(CF_2)_7(CH_2)_2Si(OCH_3)_3$ (TSL8233 (trade name) made by Toshiba Silicone Co.) was mixed with 2 parts by weight of $(CH_3)_2CHCH_2Si(OCH_3)_3$. Then, this mixture was diluted with 100 parts by weight of ethanol. Then, 1 part by weight of oxalic acid as the acid catalyst was added to the diluted mixture. Then, this mixture was stirred for about 30 min at room temperature. Then, 1 part by weight of $CH_3Si(NCO)_3$ (SIC003 made by Matsumoto Seiyaku Co.) was added to the mixture. Then, this mixture was stirred for about 5 min. With this, the water-repellent coating solution having a viscosity of about 2 cP (at 25° C.) was obtained.

The obtained water repellent film, the UV and IR absorbing film and the protective film were respectively about 12 nm, about 6 μm and about 3 μm in thickness.

The same evaluation tests as those of Example 6 were conducted. Similar to Example 6, the results of the tests were satisfactory.

EXAMPLE 13

In this example, Example 6 was repeated except in that another water-repellent coating solution was used. In fact, a method of preparing this coating solution was substantially the same as that of Example 12, except in that 1 part of $CH_3(CH_2)_{11}Si(OC_2H_5)_3$ (n-dodecyltriethoxysilane) was used in place of isobutoxysilane. The prepared coating solution had a viscosity of about 2 cP at 25° C.

The prepared primer coating solution had 10 wt % of solid matter. Its viscosity was 260 cP (at 25° C.). The obtained water repellent film, the UV and IR absorbing film and the protective film were respectively about 11 nm, about 6 μm and about 3 μm in thickness.

The same evaluation tests as those of Example 6 were conducted. Similar to Example 6, the results of the tests were satisfactory.

Comparative Example 5

In this comparative example, Example 6 was repeated except in that another water-repellent coating solution not according to the present invention was used. In fact, a method of preparing this coating solution was substantially the same as that of Example 6, except in that the silicon isocyanate was omitted. The prepared coating solution had a viscosity of about 2 cP at 25° C.

The prepared primer coating solution had 10 wt % of solid matter. Its viscosity was 260 cP (at 25° C.). The obtained water repellent film, the UV and IR absorbing film and the protective film were respectively about 10 nm, about 6 μm and about 3 μm in thickness.

The same evaluation tests as those of Example 6 were conducted in each of Comparative Examples 5–7. In each of Comparative Examples 5–7, the water repellent film was damaged by the primer coating solution, and the primer coating solution remained on the water repellent film after the dip of the water repellent film in the primer coating solution. In each of Comparative Examples 5–7, the contact angle of water drop and the inclination angle of the glass substrate, after the formation of the protective film varied among the samples, unlike Examples 6–13. In other words, for example, in Comparative Example 5, the contact angle as the final water repellency was within a range from 60 to 90 degrees, as shown in Table.

Comparative Example 6

In this comparative example, Example 6 was repeated except in that another water-repellent coating solution not according to the present invention was used. In fact, a method of preparing this coating solution was substantially the same as that of Example 11, except in that the fluoroalkylsilane was omitted. The prepared coating solution had a viscosity of about 3 cP at 25° C.

The prepared primer coating solution had 10 wt % of solid matter. Its viscosity was 260 cP (at 25° C.). The obtained water repellent film, the UV and IR absorbing film and the protective film were respectively about 15 nm, about 6 μm and about 3 μm in thickness.

The same evaluation tests as those of Example 6 were conducted.

Comparative Example 7

In this comparative example, Example 6 was repeated except in that a commercial water-repellent coating solution (SUPER RAIN X (trade name) made by Nishikie-Do Co.) not according to the present invention was used.

The prepared primer coating solution had 10 wt % of solid matter. Its viscosity was 260 cP (at 25° C.). The obtained water repellent film, the UV and IR absorbing film and the protective film were respectively about 8 nm, about 6 μm and about 3 μm in thickness.

The same evaluation tests as those of Example 6 were conducted.

TABLE

|  | Initial Water Repellency | | Final Water Repellency | |
| --- | --- | --- | --- | --- |
|  | Contact Angle (°) | Inclination Angle (°) | Contact Angle (°) | Inclination Angle (°) |
| Example 6 | 110 | 25 | 110 | 20 |
| Example 7 | 111 | 28 | 110 | 25 |
| Example 8 | 110 | 25 | 110 | 20 |
| Example 9 | 110 | 25 | 110 | 20 |
| Example 10 | 105 | 20 | 105 | 20 |
| Example 11 | 104 | 15 | 105 | 20 |
| Example 12 | 103 | 15 | 105 | 20 |
| Example 13 | 101 | 10 | 103 | 15 |
| Com. Ex. 5 | 112 | 20 | 60–90 | 30–50 |
| Com. Ex. 6 | 80 | 30 | 60–80 | 30–50 |
| Com. Ex. 7 | 101 | 8 | 50–80 | 10–30 |

What is claimed is:

1. An ultraviolet and infrared absorbing glass plate comprising:

a transparent glass substrate comprising a first surface and a second surface opposite said first surface;

a first layer formed on said first surface of the glass substrate, said first layer comprising an ultraviolet and infrared absorbing film prepared by hardening a primer coating solution, said primer coating solution comprising a synthetic resin, a fluorescent brightening agent, an ultraviolet absorbing agent and an infrared absorbing agent, wherein the weight ratio of ultraviolet absorbing agent to fluorescent brightening agent is in a range of 0.5:1 to 10:1, and the weight ratio of infrared absorbing agent to fluorescent brightening agent is in a range of 0.3:1 to 10:1, the ultraviolet absorbing agent, infrared absorbing agent and fluorescent brightening agent are soluble in the primer coating solution; and a second layer formed on said first layer, said second layer comprising an abrasion resistant film of a siloxane polymer having a thickness in a range of 1 to 5 microns.

2. A glass plate according to claim 1, wherein said synthetic resin is an acrylic resin.

3. A glass plate according to claim 1, further comprising a water repellent layer formed on said second surface of the glass substrate, wherein said water repellent layer comprises a mixture of about 0.1 to about 5 parts by weight of fluoroalkylsilane and optionally from about 0.1 to about 15 parts by weight of alkylsilane, the mixture so formed being diluted with 90–110 parts by weight of diluting solvent, 0.1 to 5 parts by weight of acid catalyst being added to the diluted mixture and then 0.1–10 parts by weight of silicon isocyanate being added thereto.

4. A glass plate according to claim 3, wherein the water repellent layer is prepared by hardening a water-repellent coating solution containing the silicon isocyanate and the fluoroalkylsilane.

5. A glass plate according to claim 4, wherein the water-repellent coating solution further contains an alkylsilane.

6. A glass plate according to claim 4, wherein the water-repellent coating solution further contains the diluting solvent and an acid catalyst.

7. A glass plate according to claim 1, wherein said infrared absorbing agent contains at least one selected from the group consisting of complexes of dithiol and nickel, phthalocyanine compounds and immonium salt compounds.

8. A glass plate according to claim 1, wherein said ultraviolet absorbing agent is one selected from the group consisting of benzophenone, benzotriazole, cyanoacrylate and salicylate.

9. A glass plate according to claim 1, wherein said primer coating solution further contains an adhesion improving agent for improving adhesion of said first layer to said glass substrate, wherein said agent comprises a silane coupling agent present in a weight ratio of the silane coupling agent to the synthetic resin in the primer coating solution in a range from about 0.25:1 to about 4:1.

10. A glass plate according to claim 1, wherein said primer coating solution further contains an adhesion improving agent for improving adhesion of said first layer to said glass substrate, wherein said adhesion improving agent is a silicone-modified acrylic resin and is present in a weight ratio of the silicone-modified resin to the synthetic resin in the primer coating solution in a range from about 0.25:1 to about 4:1.

11. A glass plate according to claim 1, wherein said glass substrate is made of one selected from the group consisting of an inorganic glass and a resin glass.

* * * * *